US011157726B2

(12) United States Patent
Swisher et al.

(10) Patent No.: US 11,157,726 B2
(45) Date of Patent: Oct. 26, 2021

(54) PERSON IDENTIFICATION SYSTEMS AND METHODS

(71) Applicant: KONINKLIJKE PHILIPS N.V., Eindhoven (NL)

(72) Inventors: Christine Menking Swisher, San Diego, CA (US); Asif Rahman, Brookline, MA (US)

(73) Assignee: KONINKLIJIKE PHILIPS N.V., Eindhoven (NL)

( * ) Notice: Subject to any disclaimer, the term of this patent is extended or adjusted under 35 U.S.C. 154(b) by 106 days.

(21) Appl. No.: 15/952,415

(22) Filed: Apr. 13, 2018

(65) Prior Publication Data

US 2018/0300540 A1    Oct. 18, 2018

Related U.S. Application Data

(60) Provisional application No. 62/485,654, filed on Apr. 14, 2017.

(51) Int. Cl.
*G06K 9/00* (2006.01)
*G06K 9/46* (2006.01)
(Continued)

(52) U.S. Cl.
CPC ..... *G06K 9/00362* (2013.01); *G06K 9/00221* (2013.01); *G06K 9/00288* (2013.01);
(Continued)

(58) Field of Classification Search
None
See application file for complete search history.

(56) References Cited

U.S. PATENT DOCUMENTS 5,771,307 A     6/1998  Lu et al.
2007/0237364 A1  10/2007  Song et al.
(Continued)

FOREIGN PATENT DOCUMENTS

WO    2013027141 A2    2/2013

OTHER PUBLICATIONS

Chung, Dahjung, Khalid Tahboub, and Edward J. Delp. "A two stream Siamese convolutional neural network for person re-identification." Proceedings of the IEEE International Conference on Computer Vision. 2017. (Year: 2017).*
(Continued)

*Primary Examiner* — Kim Y Vu
*Assistant Examiner* — Nathan J Bloom

(57) ABSTRACT

Techniques disclosed herein relate to identifying individuals in digital images. In some embodiments, a digital image(s) that captures a scene containing one or more people may be acquired. The single digital image may be applied as input across a single machine learning model. In some implementations, the single machine learning model may be trained to perform a non-facial feature recognition task and a face-related recognition task. Output may be generated over the single machine learning model based on the input. The output may include first data indicative of non-facial features of a given person of the one or more people and second data indicative of at least a location of a face of the given person in the digital image relative to the non-facial features. In various embodiments, the given person may be identified based at least in part on the output.

20 Claims, 6 Drawing Sheets

(51) Int. Cl.
*G06K 9/62* (2006.01)
*G06K 9/32* (2006.01)
*G06N 3/04* (2006.01)
*G06N 3/08* (2006.01)
*G06N 7/00* (2006.01)

(52) U.S. Cl.
CPC ..... *G06K 9/00771* (2013.01); *G06K 9/00892* (2013.01); *G06K 9/3233* (2013.01); *G06K 9/4628* (2013.01); *G06K 9/6271* (2013.01); *G06N 3/0454* (2013.01); *G06N 3/08* (2013.01); *G06N 7/005* (2013.01)

(56) References Cited

U.S. PATENT DOCUMENTS

| | | | |
|---|---|---|---|
| 2011/0222724 | A1 | 9/2011 | Yang et al. |
| 2011/0274314 | A1 | 11/2011 | Yang et al. |
| 2013/0142423 | A1 | 6/2013 | Zhang et al. |
| 2014/0205165 | A1* | 7/2014 | Jeanne ............... A61B 5/1171 382/128 |
| 2016/0217260 | A1 | 7/2016 | Aarts et al. |
| 2017/0132527 | A1* | 5/2017 | Ahn ...................... G16H 50/20 |
| 2018/0039867 | A1* | 2/2018 | Cheng ................ G06K 9/00536 |
| 2018/0157916 | A1* | 6/2018 | Doumbouya ...... G06K 9/00268 |
| 2018/0157939 | A1* | 6/2018 | Butt ........................ G06K 9/66 |

OTHER PUBLICATIONS

Bertinetto, L., Valmadre, J., Henriques, J. F., Vedaldi, A., & Torr, P. H. (Oct. 2016). Fully-convolutional Siamese networks for object tracking. In European conference on computer vision (pp. 850-865). Springer, Cham. (Year: 2016).*

U.S. Appl. No. 62/430,307 of US PG-Pub 2018/0157916 filed Dec. 5, 2016 (Year: 2016).*

Butt et al, U.S. Appl. No. 62/430,292, filed Dec. 5, 2016, Provisional Document of US PG-PUB 2018/0157939 (Year: 2016).*

Yamaguchi, et al., "Parsing Clothing in Fashion Photographs", Stony Brook University, Stony Brook, NY (Abstract).

Long, et al.,"Fully Convolutional Networks for Semantic Segmentation", UC Berkeley, (jonlong,shelhamer,trevor@cs.berkeley.edu), pp. 1-10 (Abstract).

Luo, et al., "Pedestrian Parsing via Deep Decompositional Network", Proceed of IEEE ICCV (2013), pp. 1-8 (Abstract).

Yi, D. et al., "Deep Metric Learning for Person Re-Identification", 2014, 22nd International Conference on Pattern Recognition.

* cited by examiner

PERSON IDENTIFICATION SYSTEMS AND METHODS

CROSS-REFERENCE TO RELATED APPLICATIONS

The present application claims the benefit of U.S. Provisional Application No. 62/485,654, filed Apr. 14, 2017. These applications are hereby incorporated by reference herein.

TECHNICAL FIELD

The present disclosure is directed generally, but not exclusively, to identifying people in digital images. More particularly, but not exclusively, various methods and apparatus disclosed herein relate to identifying people in digital images using non-facial features such as clothing, accessories, hair, and so forth, in addition to or instead of facial features.

BACKGROUND

There are a number of scenarios in which it may be desirable to automatically identify people based on digital images that capture scenes containing the people. For example, when patients visit the hospital, they typically are registered, triaged, and then sent to an area such as a waiting room to wait for hospital resources such as physicians to become available to examine and/or treat the patients. Being able to automatically identify individual patients may be helpful for continuing to monitor their conditions (e.g., for deterioration) while they wait for allocation of medical resources. It may also be helpful for determining if/when patients left without being seen (LWBS). Automatically identifying people based on digital images may also be useful in a variety of other contexts. While identifying people is possible using facial recognition (e.g., via a classifier), it may require that the digital images under analysis be of a relatively high resolution so that facial features (e.g., eyes, nose, mouth, etc.) are discernable. Additionally, in a context such as a waiting room in which a mounted camera may acquire the digital images to be analyzed, there is no guarantee (and indeed it may be unlikely) that the waiting patients are positioned in a manner conducive to facial recognition, e.g., because their faces may not be fully visible and/or may be partially or completely obstructed (e.g., by a book, magazine, smartphone, etc.).

SUMMARY

The present disclosure is directed to methods, systems, and apparatus for automatically identifying people depicted in acquired digital images. As one non-limiting example, a plurality of triaged patients may wait in a waiting room until they can be seen by an emergency medicine physician. The patients may be included in a patient monitoring queue (also referred to simply as a "patient queue") that is ordered or ranked, for instance, based on a measure of acuity associated with each patient (referred to herein as a "patient acuity measure") that is determined based on information obtained/acquired from the patient by a triage nurse, as well as other data points such as patient waiting time, patient presence, etc. One or more "vital sign acquisition cameras" mounted in the waiting room may be configured to periodically perform contactless and/or unobtrusive acquisition of one more updated vital signs and/or physiological parameters from each patient. These updated vital signs and/or physiological parameters may include but are not limited to temperature, pulse, oxygen saturation ("$SpO_2$"), respiration rate, posture, perspiration and so forth. In order to identify a particular patient from which the vital sign acquisition cameras should acquire updated vital signs, techniques described herein may be employed to match a so-called "reference" digital image—which may in some embodiments be a digital image acquired of the patient during registration and/or triage—to a person contained in a scene captured by a relatively low resolution digital image acquired by one or more vital sign acquisition cameras, e.g., from a relatively wide field of view ("FOV").

Generally, in one aspect, a method may include: acquiring, by one or more processors, a digital image(s) that captures a scene containing one or more people; applying, by one or more of the processors, as input to a single machine learning model, the digital image, wherein the single machine learning model is trained to perform a non-facial feature recognition task and a face-related recognition task; generating, by one or more of the processors, over the single machine learning model based on the input, output that includes first data indicative of non-facial features of a given person of the one or more people and second data indicative of at least a location of a face of the given person in the digital image relative to the non-facial features; and identifying, by one or more of the processors, the given person based at least in part on the output.

In various embodiments, the single machine learning model may be further trained to facilitate parallel performance of a localization, segmentation, or parsing. In various embodiments, the machine learning model may take the form of a convolutional neural network. In various embodiments, the non-facial feature recognition task and the face-related recognition task may share one or more hidden layers. In various embodiments, the digital image may include a subsequent digital image acquired after acquisition of a reference digital image that depicts the given person, and the identifying may include comparing the first and second data to third data associated with the reference digital image. In various embodiments, the third data may include output generated by application of the single machine learning model to the reference digital image.

In various embodiments, the scene may contain multiple people, and the identifying may include comparing the first and second data to additional data associated with a plurality of reference digital images. Each of the plurality of reference digital images may depict one of the multiple people. In various embodiments, the acquiring may be performed using a vital sign acquisition camera, and the method may further include unobtrusively acquiring, by the vital sign acquisition camera in response to the identifying, one or more vital signs from the given person.

In various embodiments, the non-facial features of the given person may include one or more of clothing worn by the given person, hair of the given person, or one or more accessories adorned by the person. In various embodiments, the first data may include pixel-wise labels of the non-facial features of the given person. In various embodiments, the second data may include a spatial location associated with a face, torso, or other aspect of the given person.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Figure 1:
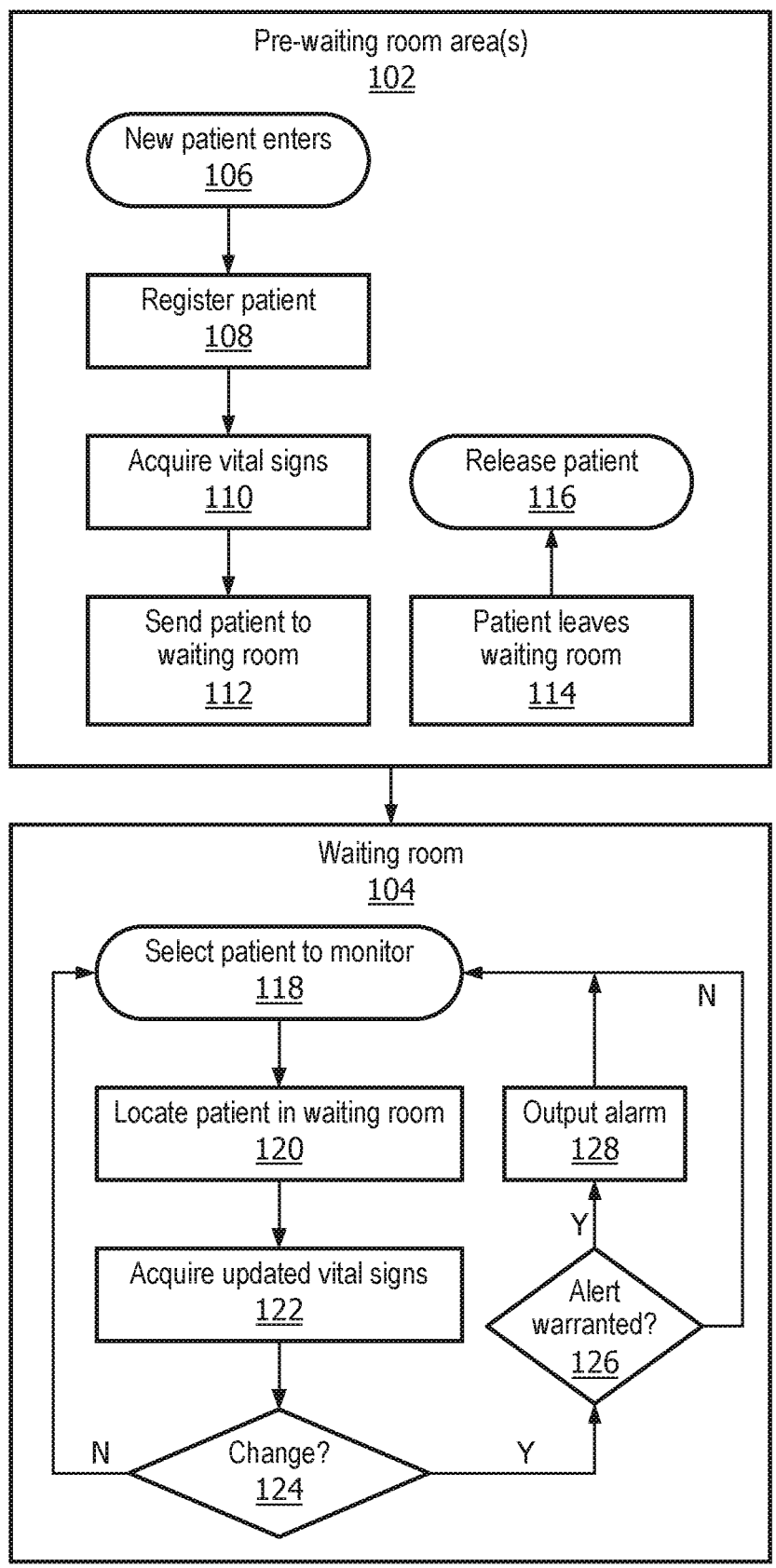
FIG. 1 schematically illustrates a general process flow for monitoring patients identified in digital images using disclosed techniques, in accordance with various embodiments.

FIG. 1 schematically illustrates generally how patients may be monitored using disclosed techniques. In particular, operations and actions are depicted that may occur in a pre-waiting room area, such as at a pre-waiting room area(s) 102, which may include reception and/or registration, and/or a triage station or booth. In addition, operations and actions are depicted that may occur in a waiting room 104. At block 106, a new patient may enter and/or approach pre-waiting room area(s) 102, e.g., after checking in at a reception desk (not depicted).

At block 108, the new patient may be registered. Registration may include, for instance, collecting information about the patient such as the patient's name, age, gender, insurance information, and reason for visit. Typically, but not exclusively, this information may be manually input into a computer by medical personnel such as a triage nurse. In some embodiments, one or more reference images of the patient may be acquired, e.g., by a camera that is integral with a computing device operated by the triage nurse, by a standalone camera, and/or by a vital sign acquisition camera (in which case at least some vital signs may be optionally acquired at registration). In many instances, the triage nurse additionally may acquire various initial vital signs and/or physiological parameters at block 110 using various medical instruments. These initial vital signs and/or physiological parameters may include but are not limited to blood pressure, pulse, glucose level, $SO_2$, photoplethysmogram ("PPG"), respiration rate (e.g., breathing rate), temperature, skin color, and so forth. While not depicted in FIG. 1, in some embodiments, other information may be gathered at triage as well, such as acquiring/updating a patient's medical history, determining patient allergies, determining patient's use of medications, and so forth.

Once the patient is registered and their initial vital signs and/or physiological parameters acquired, at block 112, the patient may be sent to waiting room 104. In some embodiments, the patient may be assigned a so-called "patient acuity measure," which may be a measure that is used to rank a severity of the patient's ailment, and in some instances may indicate an anticipated need for emergency room resources. Any number of commonly used indicators and/or clinician decision support ("CDS") algorithms may be used to determine and/or assign a patient acuity measure, including but not limited to the Emergency Severity Index ("ESI"), the Taiwan Triage System ("TIS"), the Canadian Triage and Acuity Scale ("CTAS"), and so forth. For example, in some embodiments, vital signs of the patient may be compared with predefined vital sign thresholds stored in a system database, or with published or known vital sign values typical for a given patient age, gender, weight, etc., to determine the patient's initial patient acuity measure and/or the patient's initial position in the patient queue. In some embodiments, various physiological and other information about the patient may be applied as input across a trained model (e.g., regression model, neural network, deep learning network, etc.), case-based reasoning algorithm, or other clinical reasoning algorithm to derive one or more acuity measures. In some embodiments, the information used for deriving the acuity measure may include or even be wholly limited to vitals or other information that may be captured by the vital sign acquisition camera. In some embodiments, the information used for deriving the acuity measure may alternatively or additionally include information such as information from a previous electronic medical record (EMR) of the patient, information acquired from the patient at triage, information from wearable devices or other sensors carried by the patient, information about other patients or people in the waiting room (e.g., vitals of others in the room), information about family members or others associated with the patient (e.g., family member EMRs), etc.

At block 114, it may be determined, e.g., using one or more cameras, sensors, or input from medical personnel, that a patient has left the waiting room. Block 114 may include scanning each person currently within the waiting room (e.g., as part of a seeking function that attempts to locate the patient once the patient is at top of a queue of patients for which vitals are to be captured, such as an execution of block 120 described below, or cycling through each person in the room to capture vitals, as multiple executions of the loop including blocks 118 and 120 described below) and determining that the patient was not located. In some embodiments, the system may wait until a predetermined number of instances of the patient missing is reached or a predetermined amount of time has passed during which the patient is missing before the patient is deemed to have left the waiting room to account for temporary absences (e.g., visiting the restroom or speaking with clinical staff in a triage room). For example, the patient may have been taken into the ER proper because it is their turn to see a doctor. Or the patient's condition may have improved while they waited, causing them to leave the hospital. Or the patient may have become impatient and left to seek care elsewhere. Whatever the reason, once it is determined that the patient has left the waiting room for at least a threshold amount of time, at block 116, the patient may be deemed to have left without being seen and may be released from the system, e.g., by removing them from a queue in which registered patients are entered.

At block 118, a patient in waiting room 104 may be selected for monitoring. For example, in some embodiments, a database storing registration information obtained at blocks 108-110 may be searched to select a patient having the highest patient acuity measure or a patient having the highest acuity measured that has not been monitored recently, as may be determined by a time threshold set for all patients or set (e.g., inversely correlated) based on the acuity measure. In other embodiments, registration information associated with a plurality of patients in waiting room may be ranked in a patient monitoring queue, e.g., by their respective patient acuity measures, in addition to or instead of other measures such as waiting times, patient presence in the waiting room (e.g., missing patients may be selected for monitoring more frequently to determine whether they should be released if repeatedly absent), etc. In yet other embodiments, patient acuity measures may not be considered when ranking the patient monitoring queue, and instead only considerations of patient waiting times, patient presence, etc., may be considered.

However such a patient monitoring queue is ranked, in some embodiments, the first patient in the queue may be selected as the one to be monitored next. It is not required (though it is possible) that the patient monitoring queue be stored in sequence of physical memory locations ordered by patient acuity measures. Rather, in some embodiments, a ranked patient monitoring queue may merely include a rank or priority level value associated with each patient. In other words, a "patient monitoring queue" as described herein may refer to a "logical" queue that is logically ranked based on patient acuity measures, waiting time etc., not necessarily a contiguous sequence of memory locations. Patients may be selected for monitoring at block 118 in an order of their respective ranking in the patient monitoring queue.

At block 120, the patient selected at block 118 may be located in waiting room 104. In various embodiments, one or more vital sign acquisition cameras (not depicted in FIG. 1, see FIGS. 2, and 3) deployed in or near waiting room 104 may be operated (e.g., panned, tilted, zoomed, etc.) to acquire one or more digital images of patients in waiting room 104. Those acquired digital images may be analyzed to match various visual features of the patients to visual features of one or more reference patient images captured during registration at block 108. Visual features of patients that may be matched to corresponding features of patient images include but are not limited to faces, hair, clothing, torsos, accessories (e.g., hats, purses, jewelry, etc.), and so forth. As will be described in greater detail below, various techniques may be applied to digital images captured by one or more vital sign acquisition cameras to locate a selected patient. These techniques may include edge detection, contour detection, histograms, segmentation, parsing, localization, machine learning model(s) (e.g., convolutional neural networks), and so forth. By employing these techniques as described below—particularly with respect to identifying patients using features other than facial features—in various embodiments, a technical advantage is achieved in that a vital sign acquisition camera with a relatively large FOV may capture a scene in a relatively low resolution digital image. The relatively low resolution digital image may be quickly analyzed to identify one or patients by comparing various visual features with visual features of the aforementioned reference images obtained at registration/triage.

At block 122, one or more vital sign acquisition cameras mounted or otherwise deployed in or near waiting room 104 may be operated to perform unobtrusive (e.g., contactless) acquisition of one or more updated vital signs and/or physiological parameters from the patient selected at block 118 and located at block 120. These vital sign acquisition cameras may be configured to acquire (without physically contacting the patient) a variety of different vital signs and/or physiological parameters from the patient, including but not limited to blood pressure, pulse (or heart rate), skin color, respiratory rate, PPG, $SO_2$, temperature, posture, sweat levels, and so forth. In some embodiments, vital sign acquisition cameras may be equipped to perform so-called "contactless methods" to acquire vital signs and/or extract physiological information from a patient may be used as medical image devices. Non-limiting examples of such cameras are described in United States Patent Application Publication Nos. 20140192177A1, 20140139656A1, 20140148663A1, 20140253709A1, 20140235976A1, and U.S. Pat. No. 9,125,606B2, which are incorporated herein by reference for all purposes.

At block 124, it may be determined, e.g., by one or more components depicted in FIG. 2 (described below), based on a comparison of the updated vital sign(s) and/or physiological parameters acquired at block 122 to previously-acquired vital signs and/or physiological parameters (e.g., the initial vital signs acquired at block 110 or a previous iteration of updated vital signs/physiological parameters acquired by the vital sign acquisition cameras), whether the patient's condition has changed. For example, it may be determined whether the patient's pulse, respiratory rate, blood pressure, $SO_2$, PPG, temperature, etc. has increased or decreased while the patient has waited. If the answer is no, then control may proceed back to block 118, and a new patient (e.g., the patient with the next highest patient acuity measure) may be selected and control may proceed back to block 120. However, if the answer at block 124 is yes (i.e. the patient's condition has changed), then control may pass to block 126. In some embodiments, the patient's condition may be represented (at least partially) by the same acuity measure used for purposes of determining monitoring order.

At block 126, it may be determined (again, by one or more components of FIG. 2) whether a medical alert is warranted based on the change detected at block 124. For example, it may be determined whether a change in one or more vital signs or patient acuity measures satisfies one or more thresholds (e.g., has blood pressure increased above a level that is considered safe for this particular patient?). If the answer is yes, then control may pass to block 128. At block 128, an alarm may be output, e.g., to a duty nurse or other medical personnel, that the patient is deteriorating. The medical personnel may then check on the patient to determine if remedial action, such as immediately admitting the patient or sending the patient to a doctor, is warranted. In some embodiments, control may then pass back to block 118. However, if the answer at block 126 is no, then in some embodiments, control may pass back to block 118.

Figure 2:
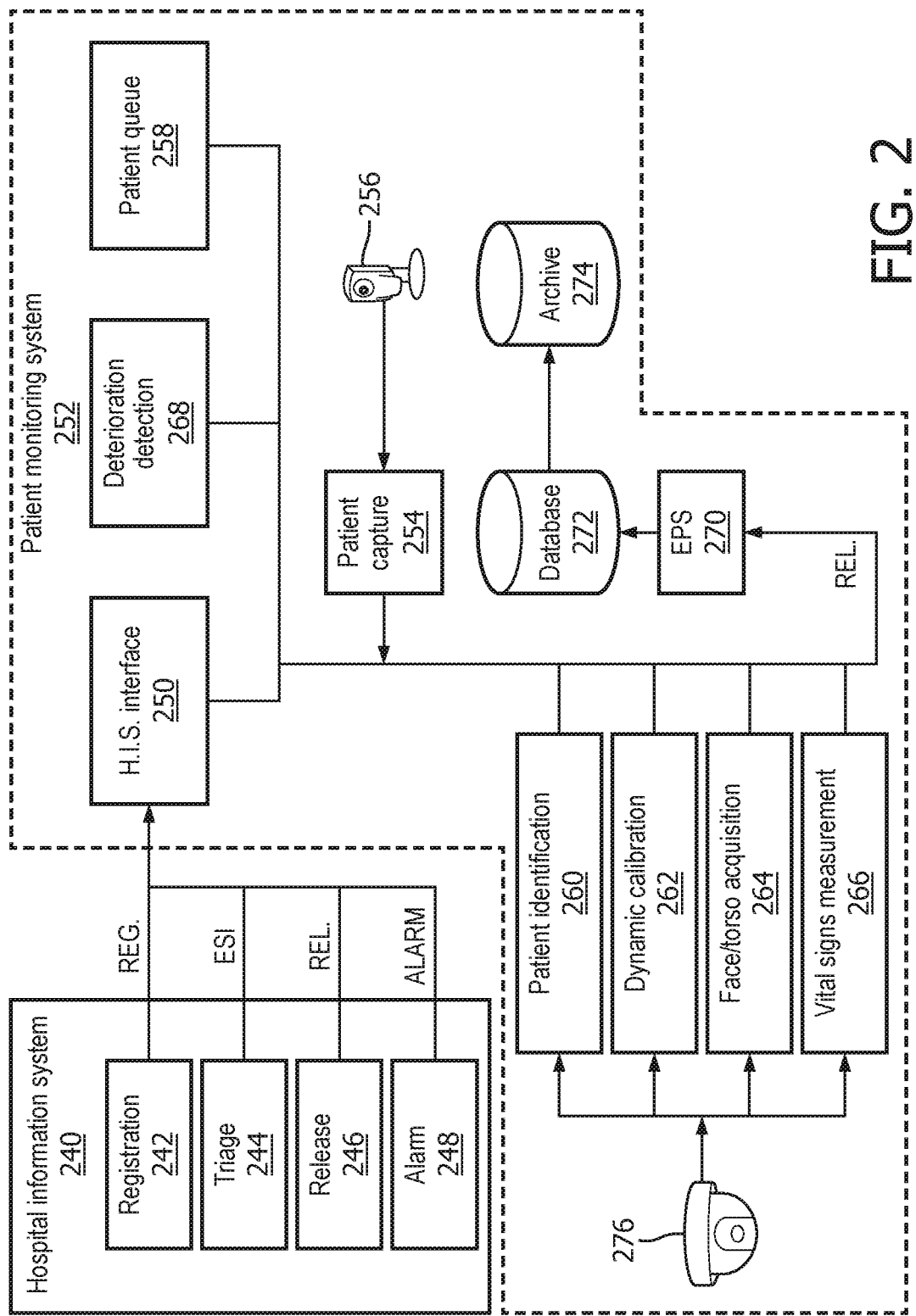
FIG. 2 illustrates an example environment in which various components of the present disclosure may implement selected aspects of the present disclosure, in accordance with various implementations.

FIG. 2 depicts example components that may be used to practice disclosed techniques, in accordance with various embodiments. A hospital information system 240 may be of the type that is commonly found in hospitals, doctor's offices, and so forth. Hospital information system 240 may be implemented using one or more computing systems that may or may not be connected via one or more computer networks (not depicted). Hospital information system 240 may include, among other things, a registration module 242, a triage module 244, a release module 246, and an alarm module 248. One or more of modules 242-248, or any other module or engine described herein, may be implemented using any combination of hardware and software, including one or more microprocessors executing instructions stored in memory. For example, the registration module 242 may include registration instructions implementing the functionality described herein in connection with registration executing on a processor while the triage module 244 may include triage instructions implementing the functionality described herein in connection with triage executing on the same processor. Similar underlying hardware and software may be used to implement other "modules" described herein.

Registration module 242 may be configured to receive, e.g., as manual input from a duty nurse, registration information of new patients. This may include, for instance, the patient's name, age, insurance information, and so forth. Triage module 244 may be configured to receive, e.g., as manual input from a duty nurse or directly from networked medical equipment, vital signs such as those described above and/or other physiological data, such as weight, height, the patient's reason for the visit, etc. In various embodiments, vital signs received by triage module 244 and/or a patient acuity measure (e.g., ESI in FIG. 2) may be associated with corresponding patient information received by registration module 242, e.g., in one or more databases (not depicted) associated with hospital information system 240.

Alarm module 248 may be configured to receive information indicative of various events, such as patient deterioration, and raise various alarms and/or alerts in response. These alarms and/or alerts may be output using a variety of modalities, including but not limited to visual output (e.g., on display screens visible to hospital personnel), intercom announcements, text messages, emails, audio alerts, haptic alerts, pages, pop-up windows, flashing lights, and so forth. Modules 242-248 of hospital information system 240 may be operably coupled, e.g., via one or computer networks (not depicted), to a hospital information system interface 250 ("H.I.S. Interface" in FIG. 2).

Hospital information system interface 250 may serve as an interface between the traditional hospital information system 240 and a patient monitoring system 252 configured with selected aspects of the present disclosure. In various embodiments, the hospital information system interface 250 may publish, e.g., to other modules of the patient monitoring system 252, various information about patients such as registration information, patient acuity measures (e.g., ESI), prescribed and/or administered medications, whether a patient has been released, various alarms/alerts, and so forth. As will be described below, in some embodiments, these publications may be provided to an event publish and subscribe ("EPS") module 270, which may then selectively store them in database 272 and/or selectively publish them to other modules of patient monitoring system 252. In some embodiments, hospital information system interface 250 may additionally or alternatively subscribe to one or more alerts or publications provided by other modules. For example, hospital information system interface 250 may subscribe to alerts from deterioration detection module 268, e.g., so that hospital information system interface 250 may notify appropriate components of hospital information system 240, such as alarm module 248, that a patient is deteriorating.

Patient monitoring system 252 may include a variety of components that facilitate monitoring of patients in an area such as waiting room 104 to ensure that patients are served in a manner conducive with their actual medical condition. Patent monitoring system 252 may include, for instance, a patient capture module 254 that interfaces with one or more cameras 256, a patient queue module 258, a patient identification module 260, a dynamic calibration module 262, a face/torso acquisition module 264, a vital signs measurement module 266, a deterioration detection module 268, the aforementioned EPS module 270, and one or more databases 272, 274. As noted above, each of modules 250, 254, and 258-270 may be implemented using any combination of hardware and software. And while these modules are depicted separately, that is not meant to be limiting or to suggest each is implemented on a separate piece of hardware. For example, one or more modules may be combined and/or omitted, and one or more modules may be implemented on one or more computing systems operably connected via one or more computer networks (not depicted). The lines depicted connecting various components of FIG. 2 may represent communication channels accessible to these components. These communication channels may be implemented using any number of networking or other computer communication technologies, such as one or more buses, Ethernet, Wi-Fi, Bluetooth, Z-Wave, ZigBee, cellular communication, and so forth.

Patient monitoring system 252 may also include one or more vital sign acquisition cameras 276 that are configured to acquire, e.g., from some distance from a patient, one or more vital signs and/or physiological parameters of the patient. Examples of such vital sign acquisition cameras were described above. In various embodiments, a vital sign acquisition camera 276 may be a pan-tilt-zoom ("PTZ") camera that is operable to pan, tilt, and zoom so that different parts of an area such as waiting room 104 are contained within its FOV. In this manner, it is possible to scan the area being monitored to locate different patients, so that updated vital signs and/or physiological parameters may be acquired unobtrusively.

Patient capture module 254 may receive, from one or more cameras 256, one or more signals carrying captured image data of a patient. For example, in some embodiments, patient capture module 254 may receive a video stream from camera 256. Patient capture module 254 may perform image processing (e.g., face detection, segmentation, shape detection to detect human form, etc.) on the video stream to detect when a patient is present, and may capture a reference digital image of the patient in response to the detection. In some embodiments, the reference digital image may be captured at a higher resolution than individual frames of the video stream, although this is not required. In some embodiments, camera 256 may be a standalone camera, such as a webcam, a PTZ camera (e.g., 276), and so forth, that is deployed in or near pre-waiting room area(s) 102. The one or more images captured by camera 256 may be used thereafter as reference digital images that are associated with patients and used later to identify patients in the area being monitored.

Patient queue module 258 may be configured to establish and/or maintain a priority queue, e.g., in a database, of patients in the area being monitored. In various embodiments, the queue may be ordered by various parameters. In some embodiments, patients in the queue may be ranked in order of patient acuity measures (i.e. by priority). For example, the most critical patients may be placed near the front of the queue and less critical patients may be placed near the end of the queue, or vice versa. In some embodiments, updated vital signs may be acquired from patients waiting in the area being monitored, such as waiting room 104, in an order of the queue. In other embodiments, updated vital signs may be acquired from patients in a FIFO or round robin order. In other embodiments, updated vital signs may be acquired from patients in an order that corresponds to a predetermined scan trajectory programmed into vital sign acquisition camera 276 (e.g., scan each row of chairs in order).

Patient identification module 260 may be configured with selected aspects of the present disclosure to use one or more digital images captured by vital sign acquisition camera 276 (or another camera that is not configured to acquire vital signs unobtrusively), in conjunction with one or more reference patient images captured by patient capture module 254, to locate one or more patients in the area being monitored (e.g., waiting room 104). Patient identification module 260 may analyze acquired digital images using various image processing techniques to identify patients using various visual features of patients. These visual features that may be used to recognize patients may include but are not limited to facial features (e.g., facial localization) and non-facial features such clothing, hair, posture, accessories, and so forth. FIG. 4, described below, depicts one example method for identifying patients using visual features of digital images. FIG. 5, also described below, schematically depicts one example computational technique for identifying patients using visual features of digital images.

In some embodiments, patient identification module 260 may search an area being monitored for particular patients from which to obtain updated vital signs. For example, patient identification module 260 may search the area being monitored for a patient selected by patient queue module 258, which may be, for instance, the patient in the queue having the highest patient acuity measure. In some embodiments, patient identification module 260 may cause vital sign acquisition camera(s) 276 to scan the area being monitored (e.g., waiting room 104) until the selected patient is identified.

Dynamic calibration module 262 may be configured to track the use of vital sign acquisition camera(s) 276 and calibrate them as needed. For instance, dynamic calibration module 262 may ensure that whenever vital sign acquisition camera 276 is instructed to point to a particular PTZ location, it always points to the same place. PTZ cameras may be in constant or at least frequent motion. Accordingly, their mechanical components may be subject to wear and tear. Small mechanical errors/biases may accumulate and cause vital sign acquisition camera 276 to respond, over time, differently to a given PTZ command. Dynamic calibration module 262 may correct this, for instance, by occasionally running a calibration routine in which landmarks (e.g., indicia such as small stickers on the wall) may be used to train a correction mechanism that will make vital sign acquisition camera 276 respond appropriately Once a patient identified by patient queue module 258 is recognized by patient identification module 260, face/torso acquisition module 264 may be configured to pan, tilt, and/or zoom one or more vital sign acquisition cameras 276 so that their fields of view capture a desired portion of the patient. For example, in some embodiments, face/torso acquisition module 264 may pan, tilt, or zoom a vital sign acquisition camera 276 so that it is focused on a patient's face and/or torso. Additionally or alternatively, face/torso acquisition module 264 may pan, tilt, or zoom one vital sign acquisition camera 276 to capture the patient's face, and another to capture the patient's torso. Various vital signs and/or physiological parameters may then be acquired. For instance, vital signs such as the patient's pulse, $SpO_2$, respiratory rate, and blood pressure may be obtained, e.g., by vital signs measurement module 266, by performing image processing on an image/video of the patient's face captured by vital sign acquisition camera(s) 276. Vital signs and/or physiological parameters such as the patient's respiratory rate, general posture (which may indicate pain and/or injury), and so forth may be obtained, e.g., by vital signs measurement module 266, by performing image processing on an image/video of the patient's torso captured by vital sign acquisition camera(s) 276. Of course, the face and torso are just two examples of body portions that may be examined to obtain vital signs, and are not meant to be limiting.

Deterioration detection module 268 may be configured to analyze one or more signals to determine whether a condition of a registered patient is deteriorating, improving, and/or remaining stable. In some embodiments, the patient condition may be represented, at least in part, by the same patient acuity measures described above for determining order of patients for monitoring. As such, the deterioration detection module 268 may include one or more CDS, case-based reasoning, or other clinical reasoning algorithms as described herein or other clinical reasoning algorithms (e.g., trained logistic regression models or other machine learning models) for assessing patient condition measures other than acuity measures described herein. In some embodiments, the algorithms for assessing patient acuity or other measures of patient condition employed by the deterioration detection module 268 may be updated from time to time by, for example, writing new trained weights (e.g., theta values) for a selected machine learning module or providing new instructions for execution by a processor (e.g. in the form of a java archive, JAR, file or compiled library). These signals may include, for instance, a patient's initial vital signs and other physiological information (e.g., obtained at blocks 108-110 of FIG. 1), updated vital signs obtained by vital signs measurement module 266, a patients initial patient acuity measure (e.g., calculated during registration), and/or a patient's updated patient acuity measure (e.g., calculated based on updated vital signs and/or physiological parameters received from vital signs measurement module 266). Based on determinations made using these signals, deterioration detection module 268 may send various alerts to various other modules to take various actions. For example, deterioration detection module 268 may publish an alert, e.g., by sending the alert to EPS module 270 so that EPS module can publish the alert to subscribed modules, such as alarm module 248 of hospital information system 240. In some embodiments, such an alert may include, for instance, a patient's name (or more generally, a patient identifier), a picture, the patient's last detected location in the waiting room, baseline vital signs, one or more updated vital signs, and/or an indication of a patient acuity measure. On receipt of the alert, alarm module 248 may raise an alert or alarm to medical personnel of the patient's deterioration and, among other things, the patient's last detected location in the waiting room.

EPS module 270 may be a general communication hub that is configured to distribute events released by various other components of FIG. 2. In some embodiments, all or at least some of the other modules depicted in FIG. 2 may generate events that indicate some form of result/determination/computation/decision from that module. These events may be sent, or "published," to EPS module 270. All or some of the other modules depicted in FIG. 2 may elect to receive, or "subscribe to," any event from any other module. When EPS module 270 receives an event, it may sent data indicative of the event (e.g., forward the event) to all modules that have subscribed to that event.

In some embodiments, EPS module 270 may be in communication with one or more databases, such as database 272 and/or archive 274 (which may be optional). In some embodiments, EPS module 270 may accept remote procedure calls ("RPC") from any module to provide access to information stored in one or more databases 272 and/or 274, and/or to add information (e.g., alerts) received from other modules to databases 272 and/or 274. Database 272 may store information contained in alerts, publications, or other communications sent/broadcast/transmitted by one or more other modules in FIG. 2. In some embodiments, database 272 may store, for instance, reference images associated with patients and/or their initial vital signs, updated vital signs (acquired by vital sign acquisition camera 276), and/or patient acuity measures. Optional archive 274 may in some embodiments store the same or similar information for a longer period of time.

It will be apparent that various hardware arrangements may be utilized to implement the patient monitoring system 252. For example, in some embodiments, a single device may implement the entire system 252 (e.g., a single server to operate the camera 276 to perform the vital signs acquisition functions 260-266 and to perform the vital sign(s) analysis and alerting functions including deterioration detection 268 and patient queue management 258). In other embodiments, multiple independent devices may form the system 252. For example, a first device may drive the vital sign acquisition camera 276 and implement functions 260-266 while another device(s) may perform the remaining functions. In some such embodiments, one device may be local to the waiting room while another may be remote (e.g., implemented as a virtual machine in a geographically distant cloud computing architecture). In some embodiments, a device (e.g., including a processor and memory) may be disposed within the vital sign acquisition camera 276 itself and, as such, the camera 276 may not simply be a dumb peripheral and, instead may perform the vital signs functions 260-266. In some such embodiments, another server may provide indications (e.g. identifiers, full records, or registered facial images) to the camera 276 to request that vitals be returned for further processing. In some such embodiments, additional functionality may be provided on-board the camera 276 such as, for example, the deterioration detection 268 (or preprocessing therefor) and/or patient queue module 258 management may be performed on-board the camera 276. In some embodiments, the camera 276 may even implement the HIS interface 250 or EPS 270. Various additional arrangements will be apparent.

Figure 3:
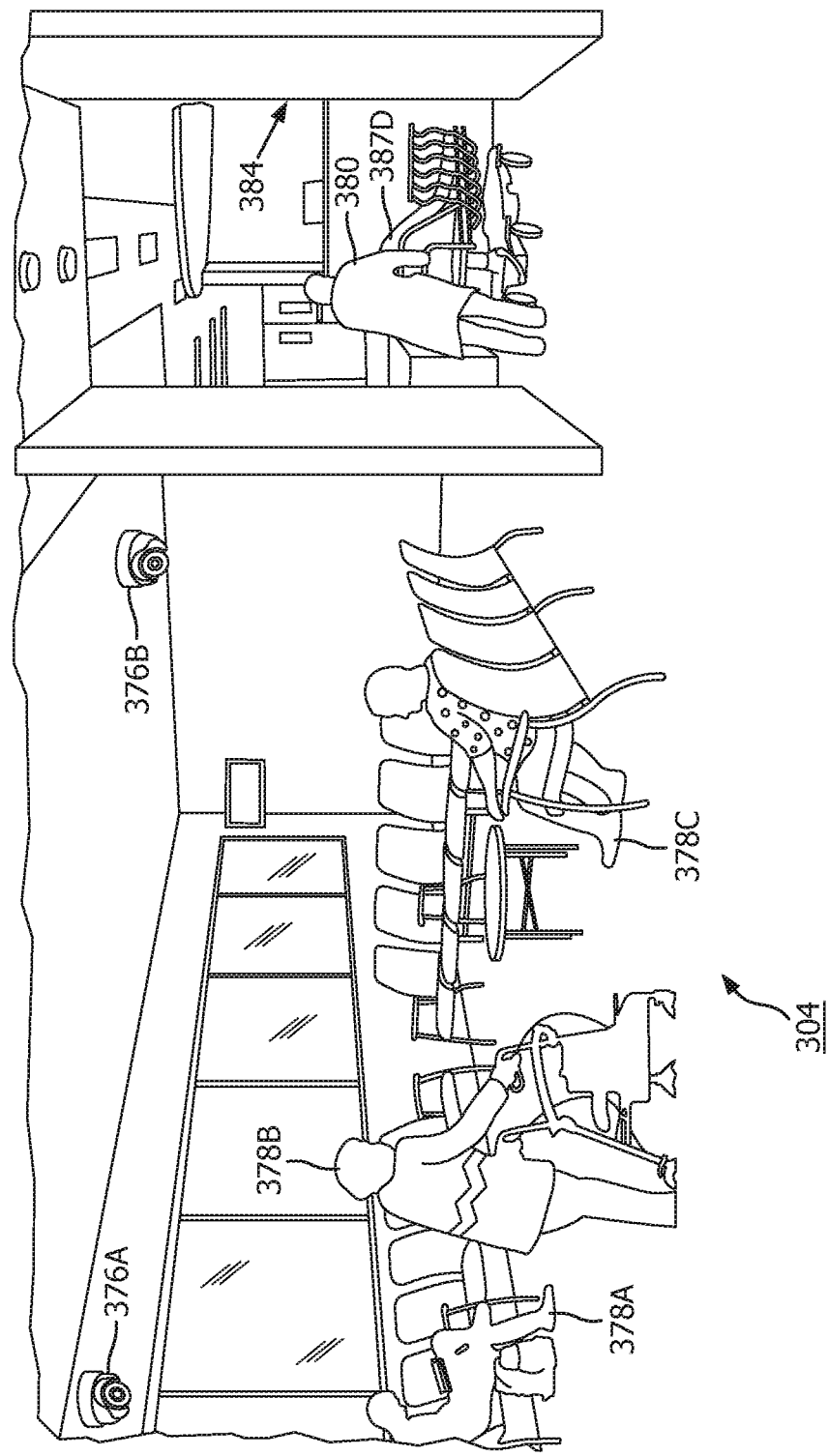
FIG. 3 depicts an example scenario in which disclosed techniques may be practiced, in accordance with various embodiments.

FIG. 3 illustrates an example scenario in which disclosed techniques may be implemented to identify patients 378A-C in a waiting room 304 for monitoring purposes. In this example, three patients 378A-C are waiting in a hospital waiting room 304 to be attended to by medical personnel 380. Two video cameras 376A, 376B are mounted on a surface (e.g., ceiling, wall) of waiting room 304. The two video cameras 376A, 376B may be used to monitor patients 378 in waiting room 304. The patients 378A-C may each be assigned a patient acuity measure by triaging medical personnel (not depicted) based on a preliminary patient condition analysis. As the patients 378 wait for an attending physician, the two video cameras 376A, 376B may capture digital image(s) that are analyzed using techniques described herein to identify patients selected for monitoring. The same video cameras (assuming they are configured to unobtrusively acquire vital signs) or different video cameras may then be operated to monitor patients 378 as described above, e.g., to detect patient deterioration. In some embodiments, a patient acuity measure associated with a patient may be updated by medical personnel in response to detection by patient monitoring system (more specifically, deterioration detection module 268) that a patient has deteriorated. In various embodiments, when a new patient enters waiting room 304, a new round of patient monitoring and prioritization may be performed, e.g., by patient monitoring system 252. The patient queue may be automatically updated, e.g., by patient queue module 258, each time a new patient enters waiting room 304. Additionally or alternatively, medical personnel may manually update the patient queue to include a newly-arrived patient after triaging.

Techniques described herein are not limited to hospital waiting rooms. There are numerous other scenarios in which techniques described herein may be implemented to identify people in digital images or videos. For example, disclosed techniques may also be used for security monitoring of crowds in airports, arenas, and other public places. In such scenarios, rather than monitoring patients to determine patient acuity measures, individuals may be identified for other purposes, such as risk assessments or post-event investigation. Techniques described herein may also be applicable in scenarios such as in fitness environments (e.g., gyms, nursing homes) or other surveillance scenarios. In addition, techniques described herein may be used to identify patients who left without being seen, without requiring that patients' faces be visible.

Figure 4A:
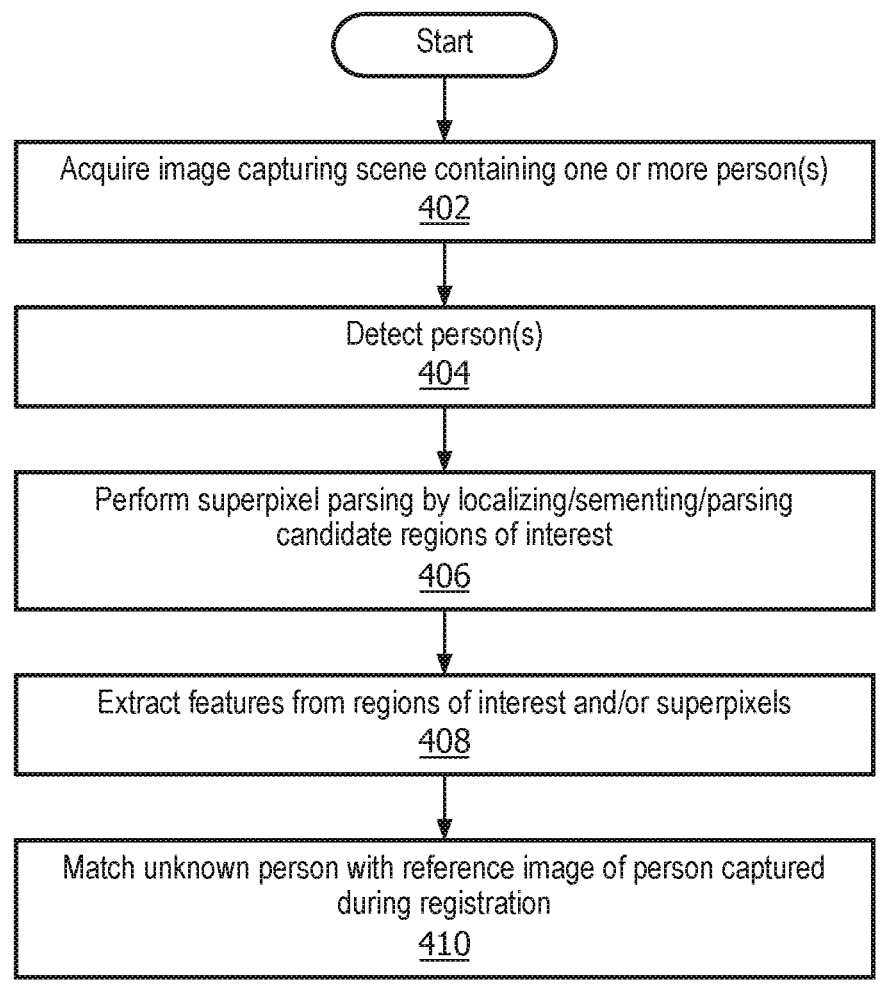
FIG. 4A depicts an example method of identifying people in digital images, in accordance with various embodiments.
Figure 4B:
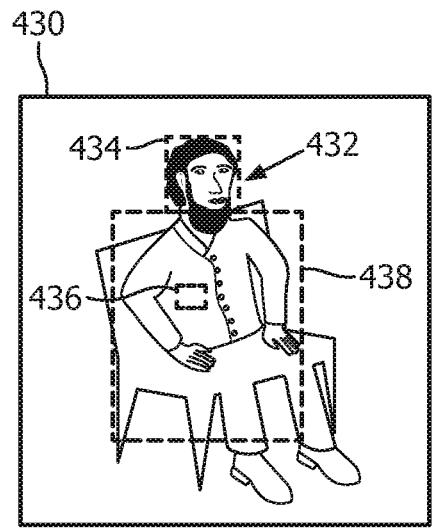
FIGS. 4B and 4C illustrate various aspects of the method depicted in FIG. 4A.
Figure 5:
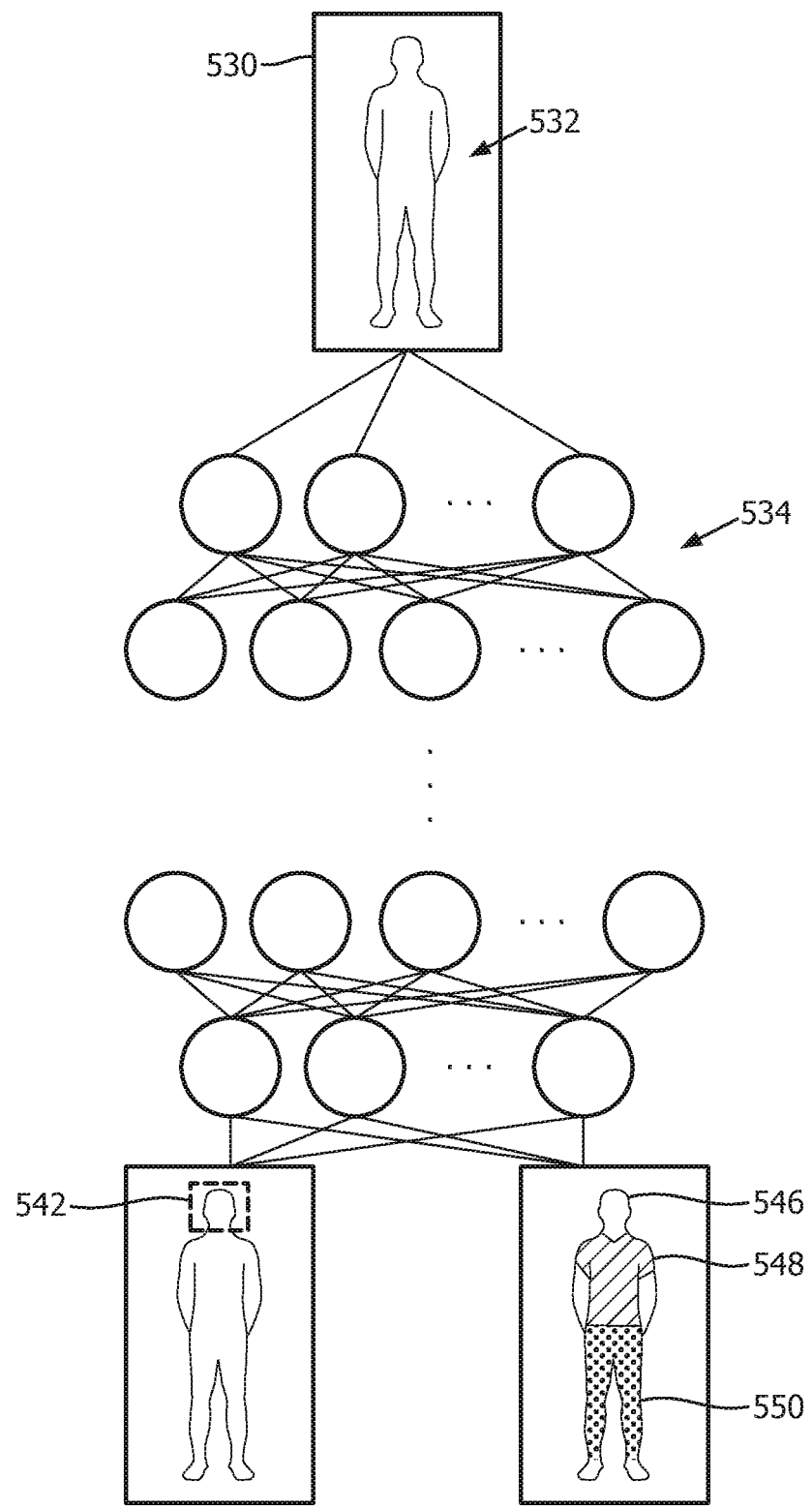
FIG. 5 schematically depicts an example of how machine learning may be employed to identify people in digital images, in accordance with various embodiments.

FIG. 4A schematically depicts, at a relatively high level, one example method for using non-facial features such as clothing, hair, accessories (e.g., hats, purses, shoes, jewelry, etc.) to improve accuracy of patient identification performed by patient identification module 260. At block 402, patient identification module 260 may acquire, e.g., via vital sign acquisition camera 276 or another camera, one or more digital images (e.g., from a video stream) that captures a scene (e.g., a waiting room) that contains one or more person(s). For example, FIG. 4B depicts an example digital image 430 that captures a person 432 sitting in a chair in a waiting room. At block 404, patient identification module 260 may detect one or more person(s) in the digital image. In some embodiments, patient identification module 260 may identify the one or more person(s) using face detection and/or person detection.

At block 406, patient identification module 260 may perform so-called "superpixel parsing." A "superpixel" may be an image patch that is more precisely aligned with edges than a rectangular patch. In some embodiments, superpixel parsing may include localizing, segmenting and/or parsing (e.g., performed in parallel) to identify candidate regions of interest ("ROI") in the image that contain, for example, non-facial features, a person's face, a person's body, etc. As used herein, "localization" may refer to identifying spatial locations such as center coordinates and/or bounding boxes (which can be rectangular, circular, or have other shapes) that identify the location of an object of interest. "Segmentation" as used herein refers to isolating one or more objects of interest (e.g., a shirt, hair, accessory, etc.) into a typically (but not exclusively) irregular shape (which may also be referred to herein as a "superpixel"). "Parsing" as used herein refers to segmentation with the additional output of a description (e.g. feature vector, plaid shirt) or "label" of the segmented object of interest (e.g., hat, red shirt, plaid coat, fur coat, etc.).

Patient identification module 260 may employ various techniques for localization. In some embodiments, patient identification module 260 may employ a Haar cascade classifier that is trained to seek out Haar-like features to localize objects such as a front of the person's face, which may contained in (e.g., bounded by) a resulting face ROI. Additionally, patient identification module 260 may localize a relatively small clothing-related ROI, which may be guaranteed to only contain clothing pixels that can subsequently be used for color feature extraction. Other ROIs may be localized as well, such as person ROIs, background ROIs, torso ROIs, leg ROIs, etc., e.g., using the face ROI as a reference. Examples of a face ROI, a clothing ROI, and a person ROI are indicated at 434, 436, and 438, respectively, in FIG. 4B.

Figure 4C:
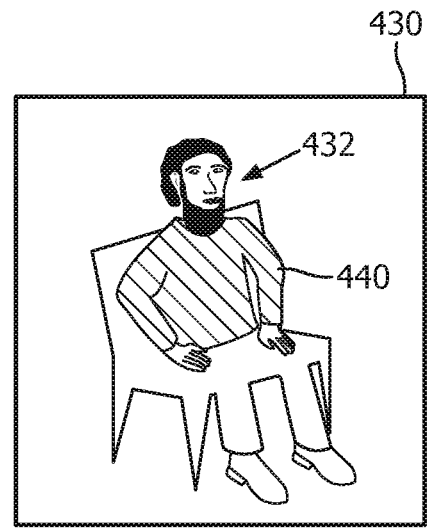

In some embodiments, patient identification module 260 next may segment and/or parse the person ROI (e.g., 438 in FIG. 4B) to identify items adorned by person 432, such as articles of clothing (e.g., the white shirt and black pants worn by person 432), accessories, and/or hair of the person. In some embodiments, patient identification module 260 may employ Max flow graph cuts and/or a Gaussian-Mixture Model ("GMM") that is estimated with expectation maximization ("EM"). While a one-dimensional single channel Gaussian may suffice for providing label probabilities, three-dimensional Gaussians may provide improved label probabilities. Other aspects of the digital image, such as edges, likelihood that a pixel can be expanded to a neighbor, etc., may be determined using a Sobel filter in some embodiments. In some embodiments, intermediate superpixels may be created based on label probabilities (e.g., per pixel or "pixel-wise" labels) and edges determined during the operations of block 406. Then, final superpixels may be generated by using only the largest connected component of each intermediate superpixel. FIG. 4C depicts one example of a superpixel 440 that approximately encloses a portion of digital image 430 that contains the white shirt worn by the person 432.

At block 408, patient identification module 260 may extract a variety of features from one or more of the ROIs and/or superpixels localized/segmented/parsed previously. For example, in some embodiments, for each foreground superpixel (e.g., a superpixel that captures an aspect of a person, such as superpixel 440 that encloses the person's shirt), patient identification module 260 may extract features such as hue-saturation-value ("HSV") color, two-dimensional color histograms (e.g. LAB color space), superpixel geometric ratios, superpixel feature similarities, edges, textures, and/or contours. In some embodiments, contours and other similar features may be extracted using algorithms such as histogram of oriented gradients ("HOG"), speeded up robust features ("SURF"), optical flow, etc. One or more of these algorithms are available as part of the Open Source Computer Vision ("OpenCV") library.

Then, at block 410, the features extracted at block 408 may be used to match the person depicted in the digital image 430 being analyzed with a person depicted in a reference image, e.g., acquired during registration as described above. In some embodiments, a multi-label classifier or similarity scoring approach may be employed to determine whether the unknown person in the digital image 430 under analysis is a match with a person depicted in a reference digital image.

The specific operations described above with respect to blocks 404-406 are just one example of how localization, segmentation and/or parsing may be used to generate one or more ROIs and/or superpixels. In other embodiments, other operations may be used by patient identification module 260. For example, in some embodiments, patient identification module 260 may first perform edge detection on the acquired digital image. Then, patient identification module 260 may perform tessellation of the digital image, e.g., using Voronoi partitioning, to identify seed regions or "cells." Then, these seed regions may be (e.g., iteratively) eroded into superpixels, and the superpixels may be pairwise matched based on similarity. Finally, patient identification module 260 may perform background detection and parsing. Then, operation may pick up at block 408 of method 400.

In other embodiments, other deep learning techniques developed for surveillance may be employed to perform localization and semantic segmentation. For example, in some embodiments, a deep decompositional network ("DDN") may be used, such as that described in Luo et al., *Pedestrian Parsing via Deep Decompositional Neural Network*, Proceedings of IEEE International Conference on Computer Vision (ICCV) (2013). This approach directly maps low-level visual features to label maps of body parts in order to accurately both detect and estimate regions of interest (e.g. face, torso, and feet) on people. The DDN approach may include use of an occlusion estimation layer that estimates a binary mask to indicate which portion of a depicted person is occluded (i.e. not visible). A completion layer synthesizes features of the occluded portion(s) of the depicted person, and a decomposition layer transforms the synthesized features into a label map. This approach may be beneficial in situations where the person of interest (e.g., a patient to be monitored unobtrusively) is only partially visible in a FOV of a vital sign acquisition camera. Once the DDN has generated the ROIs and/or superpixels, features may be extracted and person matching may be performed as described above with respect to blocks 408-410 of FIG. 4.

FIG. 5 schematically depicts another non-limiting example of how digital images acquired by cameras (e.g., 276, 376) may be analyzed using deep learning to match a person depicted in a digital image to a person depicted in a reference image, in accordance with various embodiments. In FIG. 5, a digital image 530 acquired by, for instance, a vital sign acquisition camera, may be applied as input across a machine learning model 534. In this example, digital image 530 depicts a single person 432. However, this is not meant to be limiting. In various embodiments, digital image 530 may capture a scene that contains multiple people from which one or more particular people are to be identified. In FIG. 5, machine learning model 534 takes the form of a fully convolutional neural network model, although this is not required. Other types of deep learning neural networks could be applied instead, such as recurrent neural networks, sliding window convolutional neural networks, and other convolutional architectures etc. In FIG. 5, the architecture includes a series of constricting layers to describe context and a symmetrical series of expanding layers for accurate localization (also referred to as "hidden layers"). However, an ellipses is depicted between the top two layers and the bottom two layers to indicate that such a neural network could have any number of hidden layers and other architectures.

In FIG. 5, digital image 530 may be applied, e.g., by patient identification module 260 of FIG. 2, as input across machine learning model 534. In various implementations, machine learning model 534 may include a single neural network that is trained (e.g., using digital images with semantically-labeled pixels) to jointly perform multiple tasks. In some embodiments, machine learning model 534 may be trained to perform both a non-facial feature recognition task and a face-related recognition task. Various algorithms may be used to train the model, such as batch or stochastic gradient descent, or application of the normal equations. In some embodiments, the non-facial feature recognition task and the face-related recognition task share one or more hidden layers (and hence weights associated with at least some neurons contained therein). Accordingly, in some embodiments, machine learning model 534 may be trained to localize a face and perform segmentation simultaneously, e.g., while minimizing independent cost functions associated with each task. The shared hidden layer(s) may learn a common set of features that may improve performance of each task.

Based on the input digital image 530, output may be generated, e.g., by patient identification module 260, over the single machine learning model 534. In various embodiments, the output may include first data indicative of non-facial features of the person 532 of and second data indicative of at least a location of a face of person 532 in digital image 530 relative to the non-facial features. In various embodiments, machine learning model 534 may be used in conjunction with a HOG descriptor (histogram of oriented gradients) or convolutional neural networks that perform similar bounding box tasks for localization of multiple people captured in a digital image.

Data indicative of non-facial features may come in a variety of forms. In some embodiments, non-facial features may include clothing, hair, accessories (e.g., purses, jewelry, footwear, smart phones, glasses, etc.). Thus, data indicative of non-facial features may include, for instance, clothing colors, patterns, styles (e.g., t-shirt, pants, shorts, blouse, tank top, coat, sweater, etc.), hair length, hair color, partial or complete lack of hair (e.g., baldness), purse style, purse color, purse size, jewelry color/size/style, etc. For example, in FIG. 5, data indicative of non-facial features may include (or be extracted from) a hair superpixel 546, a shirt superpixel 548, and a pants superpixel 550. Data indicative of facial features may include a localization of a face of person 532. For example, in FIG. 5, data indicative of facial features includes a bounding box 542 (which could have other shapes) that encloses the face of the person 532.

In various embodiments, the first and second data described above may be used, e.g., by patient identification module 260, to match the depicted person 532 to a reference digital image that also depicts the person (e.g., obtained during registration as described above). In some embodiments, outputs (or "features" or "activations") of each neuron in the final layer of machine learning model 534 may be used to determine a measure of similarity between person 532 depicted in digital image 530 and another depiction of a person captured in a reference digital image. For example, in some embodiments, a plurality of reference images (e.g., captured during registration) may be applied as input over machine learning model 534 to generate corresponding reference outputs (or activations or features). Likewise, one or more digital images that capture a scene containing one or more unknown persons of potential interest (e.g., waiting room captured by a PTZ camera) may also be applied as input across machine learning model 534 to generate corresponding outputs. The reference outputs generated based on the reference digital images may be compared (e.g., using a downstream machine learning model for recognition or similarity function) to the outputs generated based on the one or more current digital images to generate one or more similarity scores. For a given current digital image, the greatest similarity score may correspond to a reference digital image that depicts the same person.

As an example, suppose for multiple patients in a waiting room, reference digital images were captured during registration, and that the reference images were applied as input across machine learning model 534 to generate reference output (or "features," or "activations") associated with each reference digital image. Suppose further that patient queue module 258 of FIG. 2 selects "John Doe" as the next patient to be monitored by a vital sign acquisition camera. Patient identification module 260 may pan, tilt, and/or zoom a camera such as a vital sign acquisition camera 276 around the waiting room, e.g., with a relatively wide FOV and at a relatively low resolution, to locate John Doe. As waiting room patients are captured in the FOV (and thus, a current digital image of those patients is acquired), the current digital image may be applied as input across machine learning model 534. The generated output (e.g., "activations," "features") may be compared (e.g., using a machine learning model such as a neural network) to the reference outputs associated with the reference digital images to generate a similarity score. In some embodiments, if a similarity score satisfies some threshold (e.g., 90%), then a determination may be made that the waiting room patient captured in the current digital image matches the patient depicted in the reference image. In other embodiments, a match may be found for the waiting room patient that generates the greatest similarity score.

The techniques described above, particularly those associated with deep learning and neural networks, may provide a variety of technical advantages. When a camera is panned around a scene containing multiple people (e.g., a waiting room with multiple patients), it is likely that the people are not looking at the camera. Instead, they may be looking down, may be reading a book, may be operating a smartphone, etc., any of which may cause their face to be partially obstructed from view. If conventional facial recognition were applied in isolation, the fact that a given person's face was not visible would make matching the given person to a reference image difficult or even impossible. Moreover, relatively high resolution may be required to perform conventional facial recognition. And while conventional clothing recognition by itself may be useful to identify patients, by analyzing a combination of facial localization (which can be performed even at low resolution) and non-facial feature segmentation, it is possible to match a not-fully-visible given person to a reference image with a greater degree of accuracy. This benefit is particularly helpful in identifying patients who left without being seen, as it is not necessary to perform facial recognition. Moreover, it enables parallel identification of multiple people contained in a scene captured in a digital image. And even in scenarios where conventional facial recognition is employed, the accuracy of a facial recognition classifier can be increased by combining it with techniques described herein.

In some embodiments, individuals' privacy may be respected and/or protected in various ways. For example, rather than storing complete reference digital images of registered patients, in some embodiments, only those features/activations/output generated by application of the reference digital images to a machine learning model may be retained in memory for later comparison. The full digital images may be discarded (automatically or by request). Similarly, digital images capturing a scene in which the persons to be identified are contained may also be discarded after features/activations/outputs generated by application of the digital images are generated. Thus, when attempting to identify a person, only the features associated with the respective digital images may be retained and compared. This may alleviate concerns of some people that their images not be retained.

Figure 6:
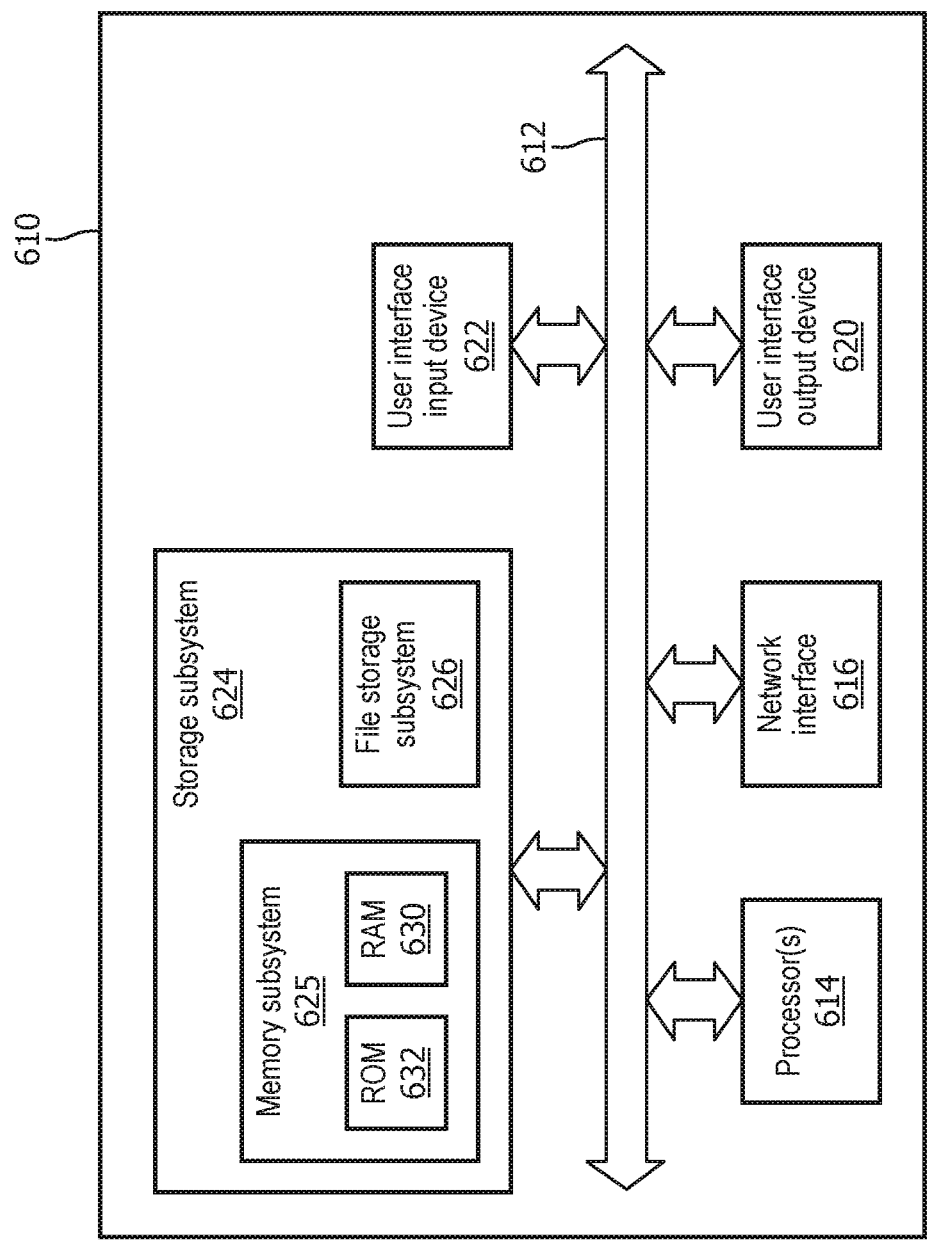
FIG. 6 depicts components of an example computer system.

FIG. 6 is a block diagram of an example computer system 610. Computer system 610 typically includes at least one processor 614 which communicates with a number of peripheral devices via bus subsystem 612. As used herein, the term "processor" will be understood to encompass various devices capable of performing the various functionalities attributed to components described herein such as, for example, microprocessors, FPGAs, ASICs, other similar devices, and combinations thereof. These peripheral devices may include a data retention subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Data retention system 624 stores programming and data constructs that provide the functionality of some or all of the modules described herein. For example, the data retention system 624 may include the logic to perform selected aspects of method 400, and/or to implement one or more components of patient monitoring system 252, including patient identification module 260.

These software modules are generally executed by processor 614 alone or in combination with other processors. Memory 625 used in the storage subsystem can include a number of memories including a main random access memory (RAM) 630 for storage of instructions and data during program execution, a read only memory (ROM) 632 in which fixed instructions are stored, and other types of memories such as instruction/data caches (which may additionally or alternatively be integral with at least one processor 614). A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the data retention system 624, or in other machines accessible by the processor(s) 614. As used herein, the term "non-transitory computer-readable medium" will be understood to encompass both volatile memory (e.g. DRAM and SRAM) and non-volatile memory (e.g. flash memory, magnetic storage, and optical storage) but to exclude transitory signals.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. In some embodiments, computer system 610 may be implemented within a cloud computing environment. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A computer-implemented method, comprising:
   acquiring reference images of one or more people in a reference area;
   acquiring, by one or more processors, a digital image that captures a scene of another area containing the one or more people;
   applying, by one or more of the processors, the digital image as input to a single machine learning model, wherein the single machine learning model is trained to perform non-facial feature recognition and face-related recognition of the one or more people in the another area;
   generating, by one or more of the processors, over the single machine learning model based on the input, output that includes first data indicative of non-facial features of a given person of the one or more people using the non-facial recognition and second data indicative of at least a location of a face of the given person in the digital image relative to the non-facial features using the face-related recognition; and
   comparing, by one or more of the processors, a combination of the location of the face and segmentation of the non-facial features of the given person to the acquired reference images to identify the given person in the another area.

2. The computer-implemented method of claim 1, wherein the single machine learning model is further trained to facilitate parallel performance of the facial localization and the non-facial feature segmentation.

3. The computer-implemented method of claim 1, wherein the single machine learning model comprises a convolutional neural network.

4. The computer-implemented method of claim 3, wherein the non-facial feature recognition task and the face-related recognition task share one or more hidden layers.

5. The computer-implemented method of claim 1, wherein the comparing comprises comparing the first and second data to third data associated with the reference images.

6. The computer-implemented method of claim 5, wherein the third data comprises output generated by application of the single machine learning model to the reference images.

7. The computer-implemented method of claim 1, wherein the scene contains multiple people, and the identifying further comprises:
   comparing the first data and the second data to additional data associated with a plurality of reference digital images, wherein each of the plurality of reference digital images depicts one of the multiple people.

8. The computer-implemented method of claim 1, wherein the acquiring is performed using a vital sign acquisition camera, and the method further comprises:
   unobtrusively acquiring, by the vital sign acquisition camera in response to the identifying, one or more vital signs from the given person.

9. The computer-implemented method of claim 1, wherein the non-facial features of the given person include one or more of clothing worn by the given person, hair of the given person, or one or more accessories adorned by the given person.

10. The computer-implemented method of claim 1, wherein the second data comprises a spatial location associated with a face, torso, or other aspect of the given person.

11. A system comprising:
   one or more processors;
   a vital sign acquisition camera in a monitoring area operably coupled with the one or more processors; and
   a memory operably coupled with the one or more processors, wherein the memory stores instructions that, in response to execution of the instructions by one or more processors, cause the one or more processors to:
   select, from a plurality of registered patients, a patient to be monitored in the monitoring area;
   acquire, via the vital sign acquisition camera, a digital image of a scene containing at least a subset of the plurality of registered patients, wherein the subset includes more than one of the plurality of registered patients;

extract, based on the digital image, one or more non-facial features of each patient of the subset, wherein the digital image comprises data associated with the non-facial features of each patient of the subset, and wherein the data associated with the non-facial features of each patient of the subset comprises pixel-wise labels of the non-facial features;

extract, based on the digital image, one or more facial features of each patient of the subset;

identify in the digital image, based upon a combination of non-facial feature segmentation and facial localization using the extracted non-facial and facial features, the patient to be monitored by comparing the non-facial feature segmentation and the facial localization with a plurality of references images of the plurality of registered patients previously acquired in a reference area, different from the monitoring area, for patient registration; and based on the identification, unobtrusively acquire, via the vital sign acquisition camera, one or more updated vital signs from the patient to be monitored.

12. The system of claim 11, wherein the non-facial features are extracted from a region of the digital image identified as a clothing region of interest.

13. The system of claim 11, wherein the non-facial features include one or more of hue-saturation-value ("HSV") colors, a two-dimensional color histogram, textures, optical flow, contours, or high level features extracted from a Deep Learning Network.

14. The system of claim 11, wherein execution of the instructions further cause the one or more processors to:

apply, as input to a single machine learning model, the digital image, wherein the single machine learning model is trained to facilitate parallel extraction of the non-facial and facial features; and generate, over the single machine learning model based on the input, output that includes the extracted facial and non-facial features.

15. The system of claim 11, wherein the one or more facial features of a given patient of the subset include a spatial location associated with a face of the given patient.

16. The computer-implemented method of claim 1, further comprising:

ranking the one or more people while in the reference area in an order of importance; and identifying the given person in the another area based on the acquired digital image in accordance with the ranking.

17. The computer-implemented method of claim 1, wherein the first data comprises pixel-wise labels of the non-facial features of the given person exclusive of background pixels.

18. The system of claim 11, wherein the monitoring area comprises a patient waiting room, separated from a pre-waiting area in which the plurality of registered patients acquired are registered.

19. The system of claim 11, wherein the plurality of registered patients are ranked in a monitoring queue based on an acuity measure associated with each patient when the plurality of registered patients are registered.

20. The system of claim 11, wherein the pixel-wise labels of the non-facial features are exclusive of background pixels.

* * * * *